July 16, 1968  C. RELLI  3,392,730
COMPOSITE GARMENT AND METHOD OF MANUFACTURING SAME
Filed Oct. 19, 1965  4 Sheets-Sheet 1

July 16, 1968 C. RELLI 3,392,730
COMPOSITE GARMENT AND METHOD OF MANUFACTURING SAME
Filed Oct. 19, 1965 4 Sheets-Sheet 3

July 16, 1968    C. RELLI    3,392,730
COMPOSITE GARMENT AND METHOD OF MANUFACTURING SAME
Filed Oct. 19, 1965    4 Sheets-Sheet 4

BY 3,392,730
COMPOSITE GARMENT AND METHOD OF
MANUFACTURING SAME
Carlo Relli, Via de'Bardi 43,
Florence, Italy
Filed Oct. 19, 1965, Ser. No. 497,685
20 Claims. (Cl. 128—454)

ABSTRACT OF THE DISCLOSURE

A reversible composite garment and method of manufacturing the same. The reversible garment is made up of a pair of standard garments of the same size and configuration each having an inside and an outside and each having a permanent elongated tubular configuration, an intermediate waist portion, an upper portion which extends upwardly from the intermediate waist portion, and a lower portion which extends downwardly from the intermediate waist portion. These standard garments are positioned one within the other with their insides directed toward each other and hidden from view while their outsides are directed away from each other and are visible at the interior and exterior of the composite garment. These standard garments are arranged one within the other with all of their three outer edge portions extending coextensively along and engaging each other and with the waist portions, upper portions, and lower portions of the garments respectively in alignment with each other. Invisible, machine-made stitching extends along substantially the entire length of these free edges of the standard garments fastening the latter to each other so that the composite garment is capable of being reversed to place a selected one of the pair of standard garments at the exterior of the composite garment at a position substantially completely covering and hiding the other of the garments from view. Thus, the pair of standard garments respectively have parts of substantially matching configuration, and the machine stitching is carried out to stitch the parts of matching configuration of the standard garments respectively to each other along their coextensively arranged free edges while the insides of these standard garments are situated at the exterior thereof, respectively, in engagement with each other and while the pair of garments are arranged with their matching portions respectively identically oriented one over the other. Thereafter, the thus-sewn garments are placed with their outsides directed away from each other and their insides directed toward each other and hidden from view so that both the machine stitching and the insides of the pair of standard garments will be rendered invisible.

---

The present invention relates to garments.

More particularly, the present invention relates to a reversible garment and a method of manufacturing the same.

Reversible garments can be composed of two standard garments of substantially the same size and configuration which are attached to each other in such a way that the user has the option of directing either one of the garments toward the outside so as to have the advantage of reversibility. Such garments are distinguished from conventional garments by the fact that the composite garment only has the outsides of the pair of standard garments visible, while the insides thereof are directed toward each other and are never directed outwardly. This is in contrast with the usual garment where the inside is always directed inwardly and the outside is always directed outwardly, the inside being provided with a suitable lining, for example, if necessary or desirable.

When sewing a standard garment where the inside of the fabric always remains directed inwardly toward the wearer, there is no problem about sewing the garment because if the stitching is visible on the inside of the garment, the appearance of the exterior thereof is not in any way affected. However, in reversible garments, where either one of the standard garments can be directed outwardly at the option of the wearer, there is a problem of carrying out the sewing in such a way that the machine stitching remains invisible irrespective of which garment is directed toward the exterior. It is, of course, highly desirable to use as much machine stitching as possible so as to keep the cost of the composite garment as low as possible, but when machine stitching a garment of this type, it is essential that all of the machine stitching be carried out at that part of the garment which will eventually be situated in the interior between the pair of standard garments, so that in this way the stitching is rendered invisible. While it is possible to provide invisible stitching from the exterior, such invisible stitching provided from the exterior must be by hand, and this, of course, would greatly increase the cost of the garment.

It is accordingly a primary object of the present invention to provide a method of manufacturing a reversible composite garment of the above type enabling the use of machine stitching for almost the entire garment, while at the same time rendering this machine stitching invisible in the finished composite garment.

In particular, it is an object of the present invention to provide a garment of this type wherein although all of the machine stitching as invisible, nevertheless it extends substantially along all of the joined free edges of the pair of standard garments which form the composite garment of the invention.

Furthermore, it is an object of the present invention to provide, in particular, a reversible bathing suit structure which conforms to the invention and which can be inexpensively manufactured with the method of the invention in such a way that all of the stitching is invisible in the final garment, even though practically all of the stitching is made by machine.

The invention is illustrated by way of example by way of the accompanying drawings which form part of the application and in which.

Figure 4:
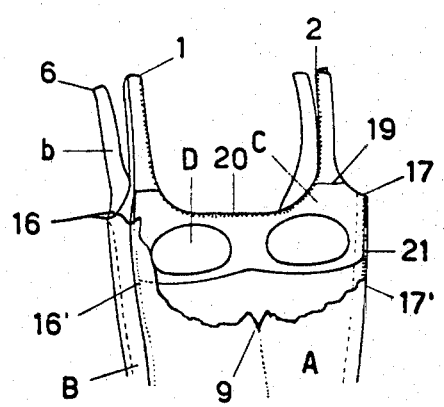
Figure 3:
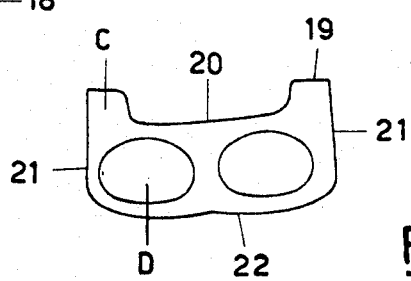
Figure 5:
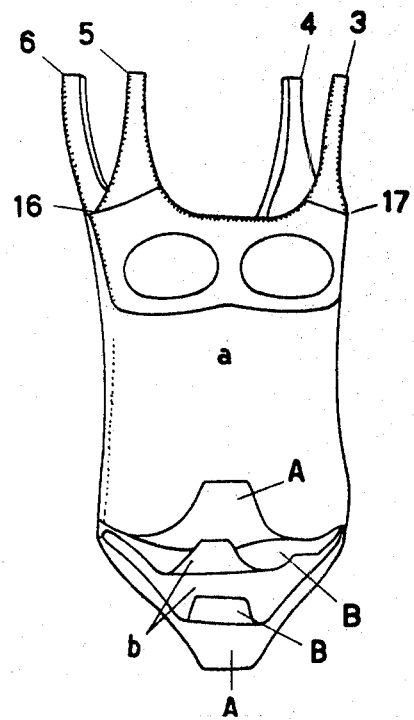
Figure 6:
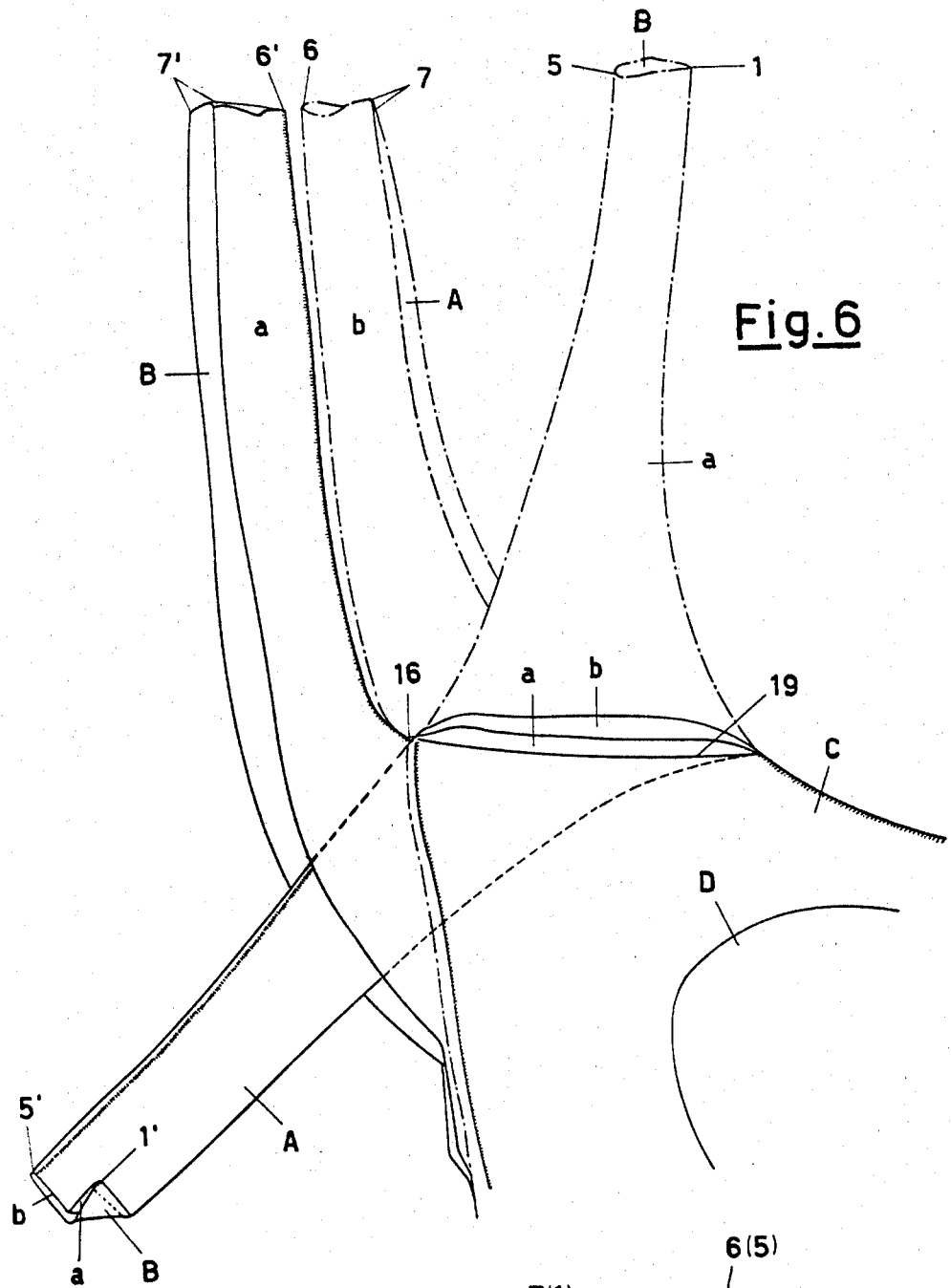
Figure 7:
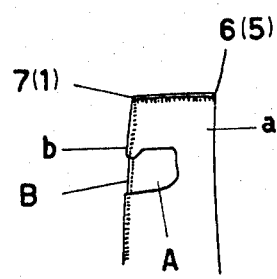
Figure 8:
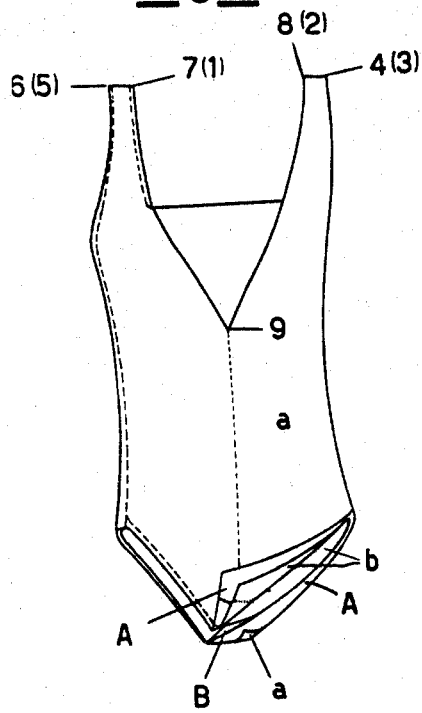

FIG. 3 diagrammatically illustrates a brassiere which is incorporated into the particular garment disclosed in this application;

FIG. 4 diagrammatically illustrates one of the initial steps of the method of the invention;

FIG. 5 illustrates the structure during a step subsequent to that of FIG. 4;

FIG. 6 shows on an enlarged scale in a fragmentary diagrammatic view the manner in which the pair of standard garments are placed relative to each other during the final portion of the sewing of the shoulder straps thereof to each other;

FIG. 7 is a fragmentary illustration of a detail of the sewing of the shoulder straps;

FIG. 8 is an elevation showing the condition of the garments during the sewing of the rear necklines thereof to each other.

Figure 9:
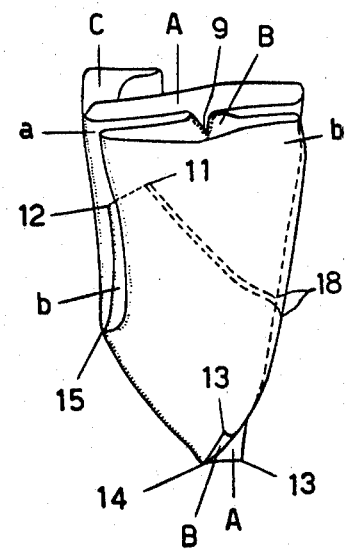
Figure 10:
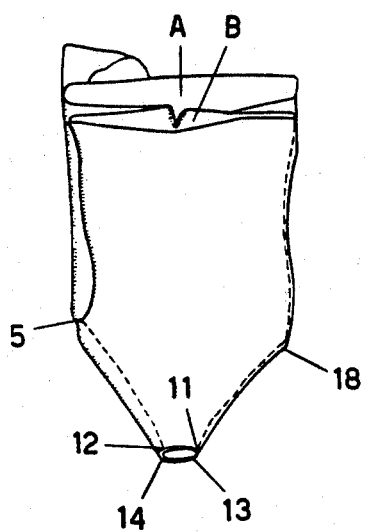
Figure 11:
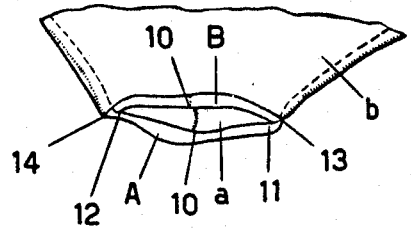
Figure 12:
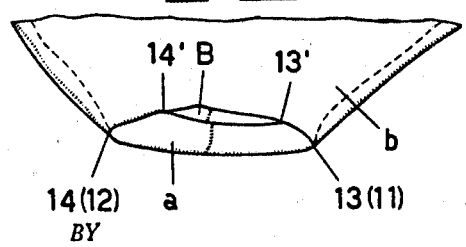
Figure 13:
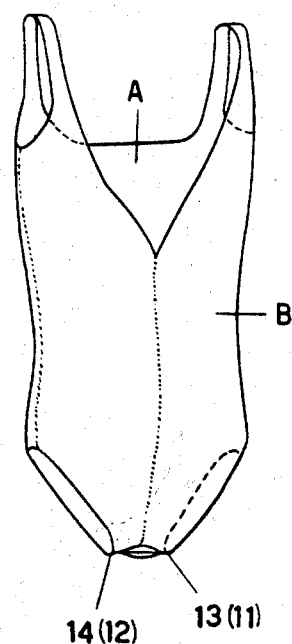
Figure 14:
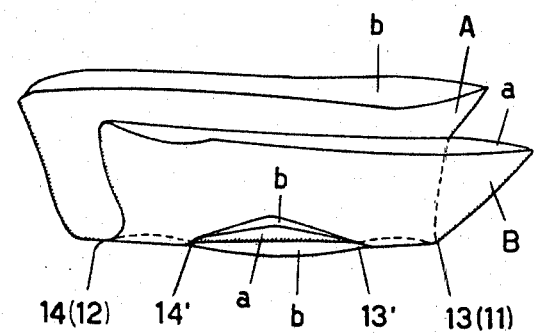
Figure 15:
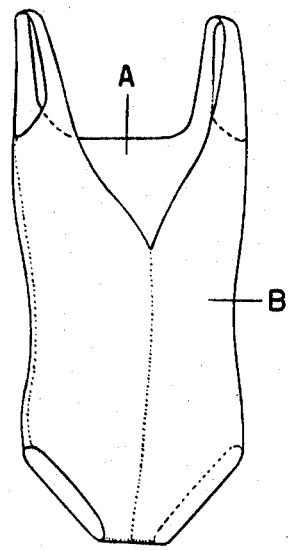

FIG. 9 fragmentarily illustrates the condition of the garments during sewing of the outer garment edges to each other along one side of the crotch;

FIG. 10 shows the garments at a stage subsequent to that of FIG. 9 after the outer edges at both sides of the crotch have been sewn together;

FIG. 11 fragmentarily illustrates the transverse crotch edges to be attached to each other;

FIG. 12 shows the manner in which the crotch edges are sewn to each other so as to leave a final opening which is not machine stitched;

FIG. 13 shows the composite garment after it has been turned inside out through the opening visible in FIG. 12;

FIG. 14 shows, fragmentarily, the lower crotch portion of the garment just before the final finishing thereof; and FIG. 15 illustrates the finished composite garment of the present invention.

The invention is illustrated, by way of example, in the sewing together of a pair of standard bathing suits which together form the composite reversible garment enabling either one of the bathing suits of the composite garment of the invention to be directed outwardly.

Figure 1:
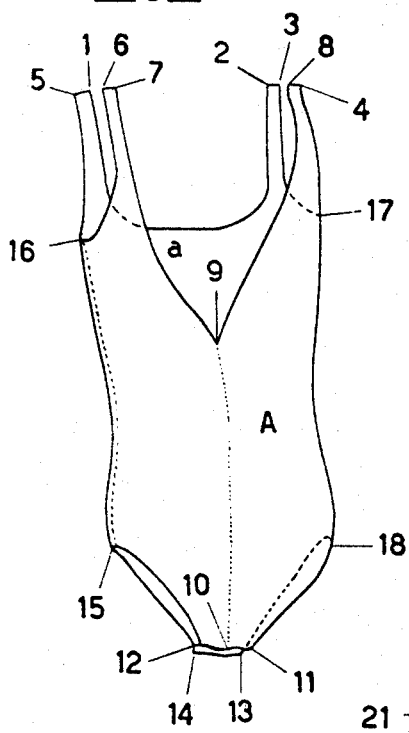
FIG. 1 is an elevation of one standard garment used in the composite garment of the invention as seen from the rear.

Referring to FIG. 1, there is shown therein one of the bathing suits which forms the final garment of the invention, and it will be noted that this bathing suit has its front shoulder straps unconnected from its rear shoulder straps and its front crotch portion unconnected from its rear crotch portion.

Figure 2:
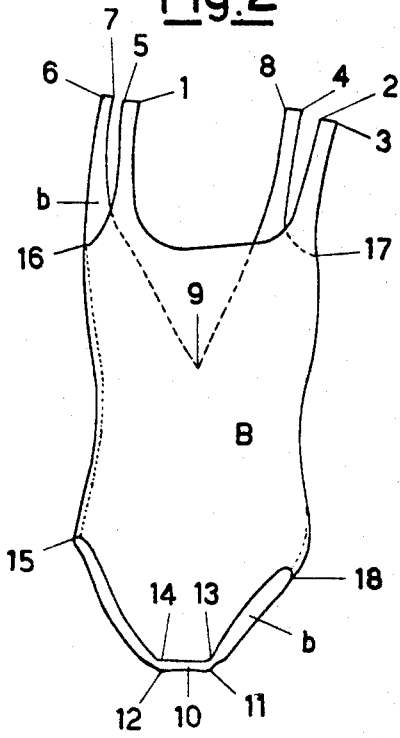
FIG. 2 is a front elevation of the other standard garment as seen from the front.

FIG. 2 shows the other of the bathing suits which it will be noted is of the same size and configuration as the bathing suit of FIG. 1 and which also has its front shoulder straps unconnected from its rear shoulder straps and its front crotch portion unconnected from its rear crotch portion. Each of these bathing suits is made of three pieces which are stitched to each other along the seams 15, 16 and 17, 18 at the sides of the garment and along the seam 9, 10 at the back of the garment. The two garments of FIGS. 1 and 2 are given corresponding reference characters to indicate the identical points thereof which are placed against each other in coextensive relationship during the attaching of the garments to each other according to the method of the invention. First, in the initial condition of the garments as treated according to the method of the invention, the edges 1–5 and 2–3 at the ends of the front pair of shoulder straps are unconnected from the edges 6–7 and 4–8 at the ends of the rear shoulder straps. The pair of front shoulder straps have inner edges which adjoin each other to form the front neckline of the garment while the pair of rear shoulder straps have inner edges which join each other to form the rear neckline to which the top end of the line of stitching 9–10 is connected. The outer edges 5–16–7 and 3–17–4 of the shoulder straps form the arm openings.

In the same way, the crotch portions have a front transverse edge 13–14 and a rear transverse edge 11–12 which are unconnected from each other, and there is one outer edge 12, 15, 14 forming one leg opening and another outer edge 11, 18, 13 forming the other leg opening.

The garment of FIG. 1 is shown with the outside A thereof directed outwardly and surrounding the inside a thereof, and in the same way, the garment of FIG. 2 is shown with its outside B directed outwardly and its inside b situated at the inside of the garment.

The particular garment disclosed includes a brassiere shown in FIG. 3. This brassiere has a web portion C carrying the reversible cups D.

Initially, according to the method of the invention, the garment of FIG. 1 is placed precisely as it is indicated in FIG. 1 on top of the garment of FIG. 2 with the front shoulder straps and front necklines of the two garments coextensively arranged in engagement with each other, and it will be noted that this is the condition in which the garments are illustrated in FIG. 4. At this time, the brassiere is placed against the inner surface a of the bathing suit of FIG. 1, in the manner indicated in FIG. 4.

The front necklines of the two garments together with the edge 20 of the brassiere are all sewn together, this edge 20 being coextensive with the front necklines of the two garments, and thereafter the sides 21 of the brassiere can be sewn to the garment of FIG. 1 along the lines of stitching 15, 16 and 17, 18 thereof. Thus, this stitching for the sides of the brassiere can extend along the lines of stitching 16, 16' and 17, 17' as indicated in FIG. 4. The bottom edge 22 of the brassiere of FIG. 3 may optionally be sewn to the garment of FIG. 1 at the inner surface a thereof, or this bottom edge may simply be left free.

After the garments are sewn together in the manner shown in FIG. 4 and described above, as a matter of convenience the garment of FIG. 2 to which the brassiere has not been attached is placed within the garment of FIG. 1 which, in addition, is turned inside out so that the garments then have with respect to each other the condition indicated in FIG. 5 where the outsides A and B are directed toward each other and the insides a and b are situated at the exterior of the garment, and of course, the brassiere also is at the exterior thereof, as indicated in FIG. 5.

The two garments are now placed in coextensive relationship and it is a simple matter to sew the shoulder straps of the garments to each other along their outer edges 5, 16, 6 and 3, 17, 4, which define the arm openings in the final garment.

It will be noted that now the front pair of shoulder straps of both garments are sewn to each other along their inner and outer edges while the rear pair of shoulder straps are sewn to each other only along their outer edges so that the inner edges of the rear shoulder straps and the rear necklines of the two garments are still unconnected. At this time, in order to complete the sewing of the shoulder straps of the two garments to each other while maintaining the machine stitching at all times invisible in the finished garment, the front pair of shoulder straps are each turned inside out. FIG. 6 shows in dot-dash lines the left pair of front and rear shoulder straps of FIG. 5 in the condition they have as shown in FIG. 5, and FIG. 6 also shows how the front shoulder strap at the left of the garment appears after it has been turned inside out so that the exterior surface A of the bathing suit of FIG. 1 is now directed outwardly at the front shoulder strap shown in FIG. 6. This front shoulder strap is extended through the back necklines and inside edges of the left rear shoulder straps which are still not connected to each other, in the manner indicated in FIG. 6, and then the front shoulder strap which has thus been turned inside out is placed along the interior of the corresponding rear shoulder strap, whereupon the shoulder straps are stitched to each other at their end edges 7(1)–6(5), as indicated in FIG. 7. Thus, at this time the corners 1' and 5' of the inside out shoulder strap shown in FIG. 6 will be placed in juxtaposition with the points 7' and 6', respectively, of the rear shoulder strap. If desired, the ends of the shoulder straps in the condition shown in FIG. 7 can be temporarily pinned to each other so as to be subsequently sewn together, although they can be stitched together at their ends in the manner shown in FIG. 7.

The same operations are performed with the shoulder strap shown at the right in FIG. 5, and then, the inside edges of the rear shoulder straps and the back neckline of the pair of bathing suits are sewn together, the garment then having the condition shown in FIG. 8. In this way, the shoulder straps are connected to each other and the stitching together of the upper portion of the pair of standard garments is completed. During this last phase of the stitching of the garments together at their upper portions, the operator can start machine stitching at the point 7(1) and continue therefrom downwardly to the point 9 and then back up to the point 8(2).

At this time, the garment of FIG. 2 is extracted from the garment of FIG. 1 in such a way that the two garments are left in back-to-back relation with their insides $a$ and $b$ still directed outwardly, as indicated in FIG. 9, and now the crotch portions of the garment of FIG. 2 are drawn upwardly away from the crotch portions of the garment of FIG. 1, at one side of the crotch, in the manner indicated in FIG. 9, so that the insides $a$ and $b$ are still directed outwardly, and the outside edges which define one of the leg openings of the two garments are sewn together with machine stitching along the line 12, 15, 14, as indicated in FIG. 9. The other leg openings are sewn together along the line 11, 18, 13 in precisely the same way, after the point 11 has been positioned so as to extend from the garment at the right thereof, as viewed in FIG. 9, thus rendering the garment easily manipulatable for the machine stitching.

The portions of the garments which are now sewn together along the lines of stitching 12, 15 and 11, 18 are returned so as to be situated within the portions thereof sewn together by the lines of stitching 14, 15 and 13, 18, and the garment will now have the position indicated fragmentarily for the lower portion in FIG. 10. This arrangement is shown in detail in FIG. 11, from which it will be noted that the transverse edges of the crotch portions of the pair of garments are still unconnected from each other.

At this time, the point 12 is placed next to the point 14 and the point 11 is placed next to the point 13, and the pair of garments are sewn to each other along the transverse edges of the crotch portions of the rear parts of the garment as viewed in FIGS. 11 and 12, and the front transverse crotch edges are sewn to each other only up to the points 13' and 14', so as to leave the opening which is clearly visible in FIG. 12. In other words, the adjoining coextensive transverse edges of the front and rear crotch portions are sewn to each other almost along a ring, leaving only the opening which remains between the points 13' and 14' shown in FIG. 12.

The entire garment has thus far been machine stitched, so that all of the machine stitching is applied to substantially all of the free coextensive edge portions of the pair of standard garments. In addition it is to be noted that all of the above machine stitching has taken place while in the immediate vicinity of the machine stitching, the outsides A and B of the garments are directly in engagement with each other so that all of the machine stitching takes place in a manner fastening the standard garments together with their outsides engaging each other at the machine stitching.

Now the entire garment is turned inside out by being passed through the opening remaining between the points 13' and 14', and the garment will then have the condition indicated in FIG. 13. It will be seen that the garment of FIG. 1 is shown in FIG. 13 within the garment of FIG. 2 with the outsides A and B of these garments directed outwardly, respectively. Furthermore, the turning of the entire garment inside out in this manner through the opening extending between the points 13' and 14' has situated the brassiere between the two garments next to the insides $a$ and $b$ thereof, so that the brassiere is no longer visible from the exterior of the garment. As is apparent from the above description, the garments have been joined to each other along their leg openings, but not along their transverse edges of the crotch portions. The transverse edges of the crotch portions of the garment of FIG. 1 were joined together in the operation as shown in FIG. 12, and all that remains to be done is to complete the opening between the points 13' and 14' for the transverse edges of the crotch portions of the garment of FIG. 2, which is situated at the exterior of the garment in the position thereof shown in FIG. 13. This last part of the stitching is done by hand in such a way as to be rendered invisible, and it has been found in practice that this opening which is hand stitched as the last operation of the method of the invention can be quite small, on the order of about three centimeters in length. The hand stitching of such a small opening can take place in a negligible amount of time, so that the labor costs involved are quite small. Therefore, the garment of the invention can be manufatcured in a very small amount of time, since practically all of the stitching is done by machine, and only this opening of about three centimeters is required to be left so as to be sewn together by hand.

The finished garment is shown in FIG. 15, while the portions of the transverse edges of the crotch of the garment of FIG. 2 which still remain to be sewn together by hand are shown more clearly in FIG. 14. Because of the reversibility of the brassiere which is now situated between the two garments, the composite garment of the invention can be worn with either one of the standard garments thereof directed outwardly. To improve the functioning of the brassiere the side edges 20 and 21 thereof can be extended so as to render the ends 19 coincident with the ends of the shoulder straps. Therefore, the brassiere can in this case be sewn into the garment during the sewing together of the front shoulder straps of the two garments along their outer edges 5, 16 and 3, 17. Also, in this way, the ends of the brassiere would be attached to the garment during the transverse sewing of the shoulder straps to each other along the lines of stitching 7(1)–6(5), and the same, of course, applies to the other pair of shoulder straps, the latter pair being illustrated in FIG. 7. Of course, the brassiere is still held in position by the sewing of the front necklines of the garments to each other along the line of stitching 1–2 and the sewing along the sides 16–16' and 17–17'.

Of course, the method described can be varied depending upon the particular garment and what is more convenient for the operator. For example, while in the specific example the remaining opening 13'–14' is at the crotch, so that the hand stitching will be situated at one of the least-exposed portions of the final garment, in another garment this opening can be situated elsewhere, and in practice it can be provided at any part of the machine stitching. Also, the opening can be left in either one of the standard garments. Moreover, the method is applicable to a two-piece garment, the upper part of which is obtained in the same way as that described above in connection with the shoulder straps and necklines, while the lower part is obtained in the manner described above in connection with the crotch. Each piece will then be machine sewn in such a way that a small opening remains through which the entire garment is turned inside out so as to have the outsides thereof directed outwardly in the final garment.

I claim:

1. A composite garment comprising a pair of standard garments of substantially the same size and configuration each having an outside and an inside, and each having a permanent elongated tubular configuration, an intermediate waist portion, an upper portion extending upwardly from said waist portion, and a lower portion extending downwardly from said waist portion, said standard garments being positioned one within the other with their insides directed toward each other and hidden from view and their outsides directed away from each other and visible at the interior and exterior of the composite garment, respectively, and said pair of standard garments being positioned with all of the free peripheral edges of one garment extending coextensively along and engaging the free peripheral edges of the other garment, and with said waist portions and upper and lower portions of both standard garments in alignment with each other, and invisible, machine-made stitching extending along substantially the entire length of said free edges of said garments and fastening the latter to each other, so that the composite garment is reversible for placing a selected one of said pair of garments at the exterior thereof at a location substantially completely covering and hiding the other standard garment from view.

2. A composite garment as recited in claim 1 and wherein said pair of standard garments are bathing suits.

3. A composite garment as recited in claim 2 and wherein a brassiere is situated between said bathing suits in engagement with the insides thereof, said brassiere being permanently fixed to one of said suits at the front of said upper portion thereof.

4. A composite garment as recited in claim 2 and wherein said machine-made stitching extends along all of the free edges of said standard garments except for approximately three centimeters of the crotch thereof.

5. A composite garment as recited in claim 4 and wherein said part of said crotch where the machine-made stitches are absent is provided with invisible hand-stitching for fastening the garments to each other at the part of the crotch from which the machine-made stitching is absent.

6. A method of making a composite, reversible garment which includes a pair of standard garments of substantially the same size and configuration, respectively having parts of matching configuration and free edges coextensively arranged and situated against each other with each garment having an inside and an outside, comprising the steps of machine stitching said matching parts of said garments to each other along said coextensively arranged free edges thereof while the insides of said garments are at the exterior thereof and engage each other and while said parts of matching configuration are identically oriented one over the other, so that thereafter when the thus-sewn garments are placed with their outsides directed away from each other and their insides directed toward each other the machine-stitching and insides of said standard garments will be rendered invisible.

7. The method of claim 6 and wherein said machine-stitching is carried out over substantially all of said coextensive free edges of said standard garments.

8. The method of claim 7 and wherein the machine-stitching is carried out to an extent which leaves only a relatively small opening through which, after completion of the machine stitching, the attached garments are turned inside out to place the outside of said garments at the exterior of the composite garment.

9. The method of claim 8 and wherein, after the entire composite garment is passed through said opening, the latter is closed by invisible hand-stitching.

10. The method of claim 6 and wherein said garments are bathing suits.

11. The method of claim 10 and wherein a brassiere is positioned in between said bathing suits in engagement with the inside thereof and stitched to one of said suits.

12. A method of manufacturing a composite, reversible bathing suit from a pair of standard bathing suits of substantially the same size and configuration and each having an outside and an inside, with said standard bathing suits each initially having a pair of front shoulder straps unconnected from a pair of back shoulder straps thereof and a front crotch portion unconnected from a back crotch portion thereof, said pair of front shoulder straps of each bathing suit respectively having inner edges which join each other to form a front neckline and the back shoulder straps of each bathing suit respectively inner edges which join each other to form a back neckline, said front and back pairs of shoulder straps having outer edges which join each other to form arm openings, and said front and back crotch portions of each standard bathing suit having outer edges which define leg openings and transverse edges at which said crotch portions are to be fastened to each other when the bathing suit is completed, comprising the following steps:

(a) sewing the standard bathing suits to each other along one of their corresponding necklines and along the inner edges of one of said pair of shoulder straps, as well as along the outer edges of both pairs of shoulder straps, so as to leave the bathing suits unconnected from each other along the corresponding pair of other necklines and along the inner edges of the other pair of shoulder straps, (b) turning said one pair of shoulder straps which have thus been sewn together at both garments along their inner and outer edges inside out and placing them in the latter inside out condition between the other pair of shoulder straps which are not yet sewn together at their inner edges, and then sewing the front pair of shoulder straps of both standard suits to the back pair of shoulder straps thereof while also sewing the pair of bathing suits to each other along the inside edges of said other pair of shoulder straps and along said other corresponding necklines thereof, (c) placing the outer edges along one of the crotch portion of each bathing suit in a condition where the outer edge at one side of the crotch portion of one bathing suit extends along the outer edge at the corresponding side of the crotch portion of the other bathing suit and sewing these outer edges to each other, (d) sewing together in the same way the outer edges at the other side of the crotch portions of the bathing suits, and then placing said crotch portions together in coextensive alignment and at least partly sewing them together at their transverse edge portions, (e) carrying out all of the previous steps while the outsides of said standard bathing suits directly engage each other and with machine-stitching along the edges which are sewn together, so that all of the above steps are made at the region where the actual sewing takes place with machine-stitching and with the insides of the standard bathing suits directed outwardly, and leaving at one part of the sewing together of the edges during one of the above steps a free unsewn portion of relatively short length defining an opening between the garments, and (f) turning the thus-sewn garment inside out while passing the entire garment through said opening so that the outsides of said standard garments become directed outwardly and the insides thereof become located against each other and are not visible at the outside.

13. The method of claim 12 and wherein a brassiere is fastened to the inside of one of said garments simultaneously with the sewing together of said garment along one of the necklines thereof.

14. The method of claim 12 and wherein the front shoulder straps of said standard garments are first sewn to each other together with the front neckline.

15. The method of claim 14 and wherein said front necklines are joined to each other while the pair of standard bathing suits are placed one next to the other with the outside of the front of one bathing suit situated against the outside of the front of the other bathing suit.

16. The method of claim 15 and wherein during sewing of the outer edges of said crotch portions to each other the pair of standard bathing suits are placed in back-to-back relation with the insides of the bathing suits directed toward each other at their back portions.

17. The method of claim 12 and wherein said opening is left at said transverse edges of said crotch portions.

18. The method of claim 17 and wherein said opening has a length of approximately three centimeters.

19. The method of claim 18 and wherein said opening is closed by hand-stitching after the bathing suits are arranged with their outsides directed outwardly.

20. The method of claim 12 and wherein said opening is finally closed by invisible hand-stitching.

References Cited

UNITED STATES PATENTS

| | | | |
|---|---|---|---|
| 1,849,514 | 3/1932 | Edelmann | 128—515 |
| 2,115,443 | 4/1948 | Flesh | 128—455 |
| 2,486,836 | 11/1949 | Garson | 128—515 |
| 2,536,222 | 1/1951 | Reid | 128—455 |
| 2,873,738 | 2/1959 | Stark | 128—159 |
| 3,020,914 | 2/1962 | Garson | 128—444 |

ADELE M. EAGER, *Primary Examiner.*